United States Patent Office 2,834,713
Patented May 13, 1958

2,834,713

PREPARATION OF ENZYME EXTRACTS FROM LIVER

Kenneth C. Robbins, Chicago, Ill., assignor to Armour and Company, Chicago, Ill., a corporation of Illinois No Drawing. Application November 22, 1952
Serial No. 322,160

9 Claims. (Cl. 195—66)

This invention relates to the preparation of an enzyme extract from liver. More particularly, this invention relates to the preparation of a purified extract from liver containing catalase in admixture with other liver enzymes, especially cathepsin (or cathepsins) and arginase. This invention also relates to a method of preparing crystalline or amorphous catalase from liver.

Prior commercial processes for preparing catalase from liver have yielded products of very low purity and disagreeable taste. Furthermore, the catalase has been obtained in poor yields based on the catalase content of the starting material. With the increasing demand for relatively high purity catalase for use in processing foods and in pharmacological applications, the need for a better process for recovering catalase from liver has become increasingly manifest.

Other enzymes in liver, particularly arginase and cathepsin, have attracted considerable interest, but no commercially feasible method has heretofore been provided for their recovery.

It is therefore a general object of this invention to provide a method for preparing an enzyme extract from liver, said extract containing at least catalase and preferably also cathepsin and arginase. More particularly, it is an object of this invention to provide a purified aqueous extract from liver containing substantially all of the catalase originally present in the starting material, while being substantially free of the non-protein constituents of liver. A similar object is envisioned with respect to cathepsin and arginase. More particularly, it is an object of this invention to develop a process for recovering catalase and other liver enzymes, which is applicable to different kinds of liver, i. e., to hog liver, beef liver, sheep liver, etc.; and which is readily applicable to large-scale commercial operations. It is an additional object of this invention to provide a method for recovering catalase and/or cathepsin from aqueous liver extracts containing these enzymes. A further specific object is to provide a method for recovering catalase in substantially quantitative yields, the catalase product at the same time having a high degree of purity and a comparatively agreeable taste. A further specific object is to prepare crystalline catalase from liver. Further objects and advantages will appear as the specification proceeds.

The starting material for use in the process of this invention can be described generically as mammalian liver, or alternatively as enzyme-bearing mammalian liver tissue. Preferably, because of their availability, either beef liver, hog liver, or sheep liver is employed. Particularly good results are obtained with beef liver.

As a preliminary step, it has been found desirable to comminute the liver while it is in frozen condition by any of the conventional methods used for this purpose, such as hashing, grinding, etc. The reason for keeping the liver frozen is to reduce the activity of the enzymes therein and autolysis to a minimum. However, freezing is not absolutely essential, since the general principle is to try to maintain the liver as fresh as possible at the start of the process.

As the first step in the process, the comminuted enzyme-bearing liver tissue is preferably washed with a mixture of water and an organic solvent for the purpose of removing substantially all of the non-protein constituents of the liver which would interfere with the recovery of the enzymes therein, together with certain of the other constituents. More specifically, among the constituents which it is desired to remove at this point can be mentioned albumin, hemoglobin, non-protein nitrogen (creatinine, urea, etc.), inorganic salts, carbohydrates, etc. In other words, it is desired to reduce the tissue to its essential protein constituents before proceeding with the process. A mixture of water and ethanol is preferred for this purpose in final washing concentrations ranging from 30 to 70% ethanol by volume. It will be understood, of course, that the liver tissue contains substantial quantities of water (generally around 80% by weight) and that this must be allowed for in determining the final washing concentration of the ethanol in the water-ethanol mixture. Preferably, the final ethanol concentration is within the range from 40 to 50% by volume. The use of temperatures at least below 0° C. is desirable in this washing step to prevent loss of enzyme activity, and at ethanol concentrations above 50%, temperatures below —15° C. may be desirable. However, it has been found that when operating in the preferred range of 40 to 50% ethanol, that temperatures from —3 to —15° C. are adequate. It has been found that there is no need to make a pH adjustment for the washing step, since the natural pH of the tissues (roughly between pH 6 to 7) gives good results. However, if desired, the pH can be adjusted to other values, and/or salts can be added. Instead of ethanol other lower primary alcohols having less than 5 carbon atoms, and particularly methanol, can be employed. Acetone can also be used with some success. For some purposes, the initial washing step can be omitted, and the rest of the process carried out with unwashed liver tissue.

The tissue solids (or residue) are separated from the bulk of the washing solution, for example by filtration or centrifugation, and are then subjected to an aqueous extraction under controlled conditions to extract the catalase together with other enzymes such as cathepsin and arginase. The pH during the extraction is quite critical and in one preferred process should be kept within the range from 6.0 to 7.0 during the extraction. Since this is approximately the natural pH range of the tissues, it will usually not be necessary to make a pH adjustment. However, if desired, the pH can be adjusted or controlled with various buffers such as acetate, citrate, phosphate, etc., or with other alkaline or acidic reagents depending on the initial pH. In carrying out the extraction, the washed enzyme-bearing tissue solids are suspended in water and agitated therein until the extration is completed. The temperature during the extraction is not particularly critical, although it is desirable to keep it below 10° C., and preferably below 5° C. The extraction conditions specified will result in the extraction of the bulk of the catalase, cathepsin, and arginase, and in addition considerable amounts of other protein constituents (which are non-active relative to the enumerated enzymes) will also be extracted. The extraction of other protein constituents in addition to the desired enzymes at this point has been found to be permissible, since these protein constituents can readily be removed from the solution in accordance with the next step in the process. This procedure is believed to result in increased yields of the desired enzymes, especially catalase and cathepsin, to be thus obtained. Still better results are obtained in this respect when the pH during the extraction is between 6.3 and 6.7. It is desired to use minimum volumes consistent with complete extraction. Preferably, from 2 to 3 volumes of water are used to extract each volume of washed tissue solids, although from 1 to 10 volumes of water to each volume of solids can be satisfactorily employed.

Following the extraction, the spent residue is separated (centrifugation or filtration), and the supernatant is subjected to an isoelectric precipitation at a pH ranging from 5.0 to 5.6 to obtain a purified enzyme extract. The pH for the isoelectric precipitation is quite critical, since it is desired to precipitate the bulk of the protein constituents which are in the solution other than the desired constituents; namely, catalase, cathepsin, and arginase. The cleanness of the separation is still further improved by operating at a pH from 5.2 to 5.4. This pH adjustment can be made by a wide variety of acids, for example, acetic, hydrochloric, sulphuric, and phosphoric acids can be used, as well as a number of organic acids, such as oxalic, citric, etc. The temperature during the isoelectric precipitation is preferably maintained at about the same temperature as during the extraction step.

Alternatively, the extraction and precipitation steps can be combined into a single step by carrying out the extraction at a pH from 5.0 to 5.6, or preferably from 5.2 to 5.4. This procedure has the advantage of decreasing the number of operational steps, since the extraction of the undesired components is minimized, while good extraction of the catalase and other desired enzymes is still obtained. However, the extraction at a high pH followed by the isoelectric precipitation is preferred because the yield of catalase is considerably greater, possibly as much as 75 to 100% higher on the average. On the other hand, both procedures may be advantageous in certain cases, and both are based on the discovery of the critical pH range for the isoelectric precipitation. In the alternative extraction procedure, the temperature and other conditions can be the same as those for the previously described extraction.

The purified extract containing at least the catalase, cathepsin, and arginase obtained by either of the above procedures is separated from the solid material, whether residue or precipitate, by the usual methods (centrifugation or filtration). This extract is rich in catalase, and can be directly utilized for certain purposes, or can be subjected to further purification to obtain the various constituents therein. This aqueous extract containing catalase among other enzymes such as cathepsin and arginase readily lends itself to recovery procedures, since it is substantially free of the non-protein constituents of liver.

Catalase can be recovered from an aqueous enzyme extract obtained from liver, such as the extract obtained above, by fractionating the extract at a pH ranging from 4.2 to 7.4, at an ionic strength below .2, and at a temperature below 0° C. by adding ethanol thereto to a concentration between 15 to 60% by volume and making any other adjustments required to achieve the stated conditions. Instead of ethanol, methanol or other similar solvent can be employed. Preferably, the concentration of the organic solvent during the fractionation ranges from 20 to 50%, the pH ranges from 5.4 to 6.2, the ionic strength is maintained below .1, and the temperature is maintained between −3 to −15° C. The best conditions for the fractionation are pH 5.7 to 5.9, ethanol concentration 35 to 45%, and ionic strength below 0.025, at −5° C.

Under these conditions, substantially all of the catalase and arginase, and a considerable proportion of the cathepsin is precipitated, while the undesired protein constituents remain in solution. The protein concentration in the extract is also of importance in this step. Preferably, the protein concentration is between 1.5 and 3.0% by weight, although concentrations of between .2 to 4% are satisfactory. The optimum protein concentration is between 2.0 and 2.5%.

The supernatant is separated from the precipitate by either centrifugation or filtration, and the supernatant is discarded. It is then possible, especially when beef liver has been employed as the starting material, to prepare crystalline catalase from the precipitated material by a relatively simple process. However, if desired, the precipitated amorphous catalase can be directly employed, since the presence therein of cathepsin and arginase are not objectionable for certain uses. The recommended procedure for preparing crystalline catalase from the precipitated material is to dissolve the precipitated material at a pH above approximately 6.5, and then to adjust the pH of the resulting solution to between 5.1 to 6.3 to crystallize the catalase. Generally, in order to get the precipitated material back into solution, it is necessary to include a salt in the water used to dissolve the precipitate. Compounds having buffering properties are particularly desirable, such as the acetate, citrate, or phosphate salts of sodium and potassium etc. By way of specific example, 0.75 M sodium acetate readily dissolves the precipitate at a pH above 5.8. Preferably, the pH of the solution during the dissolution of the precipitate is maintained within the range from 6 to 7, although higher pH's can also be used. Relatively low temperatures, that is, below 20° C. and preferably below 5° C. should be used to avoid bacterial contamination. Generally, it is desirable to clarify the supernatant by either centrifugation or filtration before adjusting the pH to obtain the crystalline catalase. The optimum pH for spontaneous crystallization of the catalase has been found to be around 5.7, although desired results have been obtained over the range from 5.1 to 6.3. As indicated, after the pH adjustment it is only necessary to allow the solution to stand for a period of time to obtain the crystalline catalase. The catalase which is removed by centrifugation is suspended in water and is solubilized by dialysis against running tap water. The soluble catalase thus obtained is generally of better than 83% purity electrophoretically, and represents from 75 to 100% yields based on the catalase content of the starting material. The electrophoretic mobility of this protein is $-3.9 \times 10^{-5}$ cm.$^2$ volt$^{-1}$ sec.$^{-1}$ in veronal buffer, pH 8.6, ionic strength 0.1. If desired, the recovered catalase can be subjected to further purification by recrystallization, or other suitable procedure.

Following the crystallization of the catalase, the supernatant will contain a considerable amount of cathepsin, which may be up to 50% of the cathepsin originally present in the starting material. Therefore, it may be desired to recover the cathepsin from the supernatant. This can be done by separating the supernatant from the crystalline catalase, and then subjecting the supernatant to further treatment to recover the cathepsin. One procedure which can be employed is to adjust the pH of the supernatant to around 4.0, to an ionic strength of around .3 (sodium chloride) and an ethanol concentration of around 40%. Temperatures of around −5° C. are preferred for this fractionation. The precipitate formed contains the bulk of the protein constituents of the solution other than the cathepsin, which remains in solution under these conditions. The operating conditions for this fractionation can be varied within certain ranges. For example, the alcohol concentration can range from 20 to 60% (preferably 35 to 45%), the pH from 3 to 5 (preferably 3.5 to 4.5), and the ionic strength from 0.00 to .5 (preferably .2 to .4). Protein concentrations of from ¼ to 3% by weight are also desirable in this step, but preferably ¾ to 1½%. The best conditions for the removal of impurities is pH 3.9 to 4.1, alcohol concentration 35 to 45%, and ionic strength of 0.2 to 0.4, at −5° C.

The precipitated material is separated from the supernatant, and sodium tungstate is added thereto to about .01 M concentration. The pH should be within the range from about 2 to 6, and the molarity of the sodium tungstate should be within the range from about 0.002 to .05.

The cathepsin will then precipitate on standing. The precipitated cathepsin can then be further purified by dissolving it in .15 M sodium acetate at a pH between 6 and 7, followed by the dialysis of the solution against running tap water to remove the tungstate ions. The solution remaining within the membrane can then be clarified and lyophilized, to obtain the final cathepsin product. This procedure has been found to give at least a 20-fold purification over the original water extract. Instead of sodium tungstate, other heavy metal salts such as sodium molybdate, can be employed.

The tungstate ions can be removed from the cathepsin preparation with salts such as barium chloride, calcium chloride, strontium chloride, etc. at an alkaline pH of approximately 10 to 11, at which pH the enzyme protein is stable and soluble. The pH can be adjusted with either sodium hydroxide or buffers, such as glycine-sodium hydroxide, etc. The concentration of salt necessary for the removal of the heavy metal anion must be determined for each preparation of cathepsin. The excess cations can be removed from solution by the addition of anions such as sulfate or oxalate ions. The cathepsin solution can then be dialyzed and lyophilized.

To more fully illustrate the various process steps encompassed within the scope of the present invention, it is desired to set forth the following detailed examples.

Example I

Fresh beef livers (50 kg.) are cut up into small pieces and immediately frozen over Dry Ice. This frozen liver is comminuted frozen. To one volume (50 kg.) of frozen comminuted liver at —20° C. is added two volumes (100 l.) of 70% ethanol, previously cooled to —20° C. The mixture is stirred for two to three hours at —5° C. After centrifugation, the residue is suspended in 2½ volumes (125.1) of water at +1° C. (based on original liver volume). The suspension is stirred for several hours and allowed to stand overnight at +1° C. The pH of the suspension should be 6.5±.3. The precipitate is removed by centrifugation and discarded.

The water extract at +1° C. is adjusted to 22±2 mg. protein per ml. and then to pH 5.3±.1 with 1 N acetic acid. This solution is stirred for one-two hours and allowed to stand overnight at +1° C. The precipitate is removed by centrifugation and discarded. The supernatant (115 l.) at +1° C. is adjusted to pH 5.80±.05 with 1 N NaOH (250 cc.) and 95% ethanol (84 l.) at —25° C. is added to 40% concentration at —5° C. The mixture was stirred for one-two hours and allowed to stand overnight at —5° C. The precipitate (2.5 kg.) was removed by centrifugation and suspended to approximately ⅕ of the water extract volume (25 l.) in 0.075 M sodium acetate at +1° C. The ionic strength of the suspension is then adjusted to 0.075 sodium acetate (pH 6.2). The suspension was stirred for two-three hours and clarified by centrifugation.

This solution is adjusted to pH 5.7±.5 with 1 N acetic acid (115 cc.) and allowed to stand for 24–48 hours at ±1° C. with occasional stirring in order to obtain maximum crystallization of catalase. The crystalline catalase is removed by centrifugation. The catalase is suspended in water (3 l. cold tap) to approximately a 1 to 2% suspension and dialyzed against running cold tap water until all of the catalase becomes soluble. The solution is clarified by centrifugation. (One gram of catalase will decompose 13,000±2,000 grams of hydrogen peroxide under the following assay conditions: One ml. of enzyme solution (proper dilution) is added to a mixture of 20 ml. 0.25% hydrogen peroxide and 5 ml. phosphate-citrate buffer pH 7.0 at 25° C. After 10 minutes, the residual hydrogen peroxide is determined by the addition of sulfuric acid and potassium iodide and titrating the iodine liberated with sodium thiosulfate). The catalase can be recrystallized at pH 5.7±5. (One gram of recrystallized catalase will decompose 19,000±2,000 grams of hydrogen peroxide.)

Example II

One volume of fresh, frozen comminuted beef liver at —20° C. is extracted with 2 volumes of 70% ethanol at —20° C. The suspension is stirred at —5° C. for 2 hours. The precipitate which is removed by centrifugation at —5° C. is then suspended in 2½ volumes of ice cold water at +1° C. (based on original liver volume). This suspension is stirred overnight at +1° C. (the pH of the suspension should be 6.5±.3). The supernatant after removal of the precipitate by centrifugation at +1° C., is adjusted to 22±2 mg. protein per ml. and then to pH 5.3±.1 with 1 N acetic acid at +1° C. The mixture is stirred for one-two hours and allowed to stand overnight at +1° C. The precipitate is removed by centrifugation at +1° C.

The supernatant is adjusted to pH 5.8±.05 with 1 N sodium hydroxide and brought to 40% ethanol concentration at —5° C. The suspension is stirred for one-two hours and then allowed to stand overnight at —5° C. The precipitate (weigh) is removed by centrifugation at —5° C. and suspended to ⅕ of the water extract volume in 0.075 M sodium acetate at +1° C. (the final molarity should be adjusted to 0.075). The suspension is stirred for two-three hours and then the precipitate is removed by centrifugation.

The supernatant is adjusted to pH 5.7±.5 with 1 N acetic acid and is allowed to stand for 24 to 48 hours at +1° C. with occasional stirring to allow for the crystallization of catalase. After removal of the precipitate, the supernatant is adjusted to pH 4.00±.05 (0.113 M acetic acid), ionic strength of 0.325 (0.025 M sodium acetate and 0.3 M sodium chloride) and a protein concentration of 11±1 mg. per ml. Add ethanol to 40% concentration at —5° C. The mixture is stirred for one-two hours and allowed to remain at —5° C. overnight. The supernatant after removal of the precipitate by centrifugation is adjusted to 0.01 M sodium tungstate with 1 M sodium tungstate. The mixture is stirred for one-two hours and allowed to remain at —5° C. overnight. The precipitate is removed by centrifugation and suspended to ½₀ of the water extract volume in 0.15 M sodium acetate at +1° C. The pH should be adjusted to 6.2±.2 with .1 N NaOH, if necessary. The mixture is stirred for two-three hours and is allowed to remain overnight at +1° C. The suspension is centrifuged and the supernatant is dialyzed against cold running tap water for 3 days. This solution is clarified and then lyophilized.

2.0 grams of lyophilized cathepsin is dissolved in 200 ml. of water at +1° C. To this solution is added 200 ml. of .4 M barium chloride which had been adjusted to pH 10.5. The mixture is adjusted to pH 10.5 with 5 N sodium hydroxide and allowed to stand for several hours at +1° C. The precipitate is removed by centrifugation and the supernatant is adjusted to 0.22 M sodium sulfate with 1 M sodium sulfate. This mixture is allowed to stand overnight at +1° C. and the precipitate of barium sulfate is removed by centrifugation. The supernatant is dialyzed against five volumes of distilled water for 48 hours at +1° C. The cathepsin solution is lyophilized.

An alternate procedure for purifying lyophilized cathepsin consists of treating the material as follows: 2.0 grams of lyophilized cathepsin is dissolved in 200 ml. of water at +1° C. To this solution is added 200 ml. of 0.1 M glycine buffer, pH 11. 1 M barium chloride is added to give a final concentration of 0.2 M barium chloride. After standing for several hours at +1° C., the precipitate is removed by centrifugation. To the supernatant is added 1 M sodium sulfate to give a final concentration of 0.22 M sodium sulfate. The precipitate of barium sulfate is removed by centrifugation. The supernatant is dialyzed for 48 hours against 5 volumes of distilled water at +1° C. The cathepsin solution is lyophilized.

*Example III*

Beef liver is collected fresh from the eviscerating table on the kill floor. The liver is quickly cut up and frozen. The liver is comminuted using a Fitzpatrick Mill with a #3 screen. The freshly comminuted liver is then stored at −20° C. or below until it is to be used.

Two volumes of 70% ethanol for every volume of liver is cooled down to −10 to −20° C. The ethanol is then added to the liver and the suspension is agitated for 3 hours. After 3 hours, the suspension is centrifuged in a Sharples refrigerated centrifuge at −5° C. and the supernatant is discarded. The residue is suspended in 2½ volumes of distilled water for every volume of liver initially used. The liver is extracted overnight at its natural water suspension pH, which is usually pH 6.5+.2. This extraction is carried out at +1° C.

The residue is removed in a Sharples refrigerated centrifuge at +1° C. and discarded. The supernatant contains the catalase and is adjusted to pH 5.3 for an isoelectric precipitation of contaminating proteins. The suspension is held overnight at +1° C. The precipitate is removed in a Sharples refrigerated centrifuge and discarded. The supernatant is adjusted to pH 5.8 and 95% 3A ethanol is slowly added at temperatures below 0° C. until an alcohol concentration of 40% is reached. The precipitate is allowed to settle overnight at −5° C.

The precipitate, which contains the catalase, is removed in a Sharples refrigerated centrifuge and the 40% ethanol supernatant is discarded. The precipitate is extracted with 0.075 M sodium acetate using ⅕ of the original water extract volume. This suspension at pH 6.2 ±.1 is extracted overnight at +1° C. and then clarified by centrifugation. The supernatant is adjusted to pH 5.7 and held 48 hours during which time the catalase crystallizes.

The catalase is removed in an International or Sharples refrigerated centrifuge and suspended in about 50 to 100 ml. of tap $H_2O$ per kilogram of liver initially used. The supernatant is used for further purification of cathepsin. The catalase suspension is then dialyzed against running tap $H_2O$ for as long as is necessary to solubilize the catalase. The tap $H_2O$ is at pH 7.0 to 7.5 at which pH the catalase becomes soluble. When the catalase is solubilized, the sac contents are clarified by centrifugation and the residue is discarded. The supernatant contains the catalase.

The beef catalase solution which is obtained by the above method is electrophoretically 83 to 95% pure.

*Example IV*

One kilogram of frozen, comminuted hog liver is suspended in two liters of 70% ethanol at −10 to −20° C. The mixture is stirred for three hours and the residue is removed by centrifugation. This residue is suspended in 2.5 liters of ice cold water and stirred for 18 hours at +1° C. The mixture is clarified and the supernatant is adjusted to pH 5.3 with 9.5 ml. of 1 N acetic acid. The mixture is stirred for several hours and allowed to stand overnight at +1° C. The precipitate is removed in a Sharples centrifuge and discarded. The supernatant, 2050 ml. is adjusted to pH 5.8 with 1 N sodium hydroxide. 1491 ml. of 95% ethanol at −25° C. are added to give a 40% ethanol concentration at −5° C. The mixture is allowed to stand overnight at −5° C. The precipitate is removed in the Sharples centrifuge and dissolved in 400 cc. of .075 M sodium acetate. The solution of catalase is clarified and lyophilized.

*Example V*

225 lbs. of hashed, frozen hog liver are suspended in 260 liters of water and extracted overnight at +1° C. The residue is removed in a Bird centrifuge and discarded. The supernatant is clarified in the Sharples centrifuge. This extract which is at pH 6.25 is adjusted to pH 5.3 with 450 cc. of 4M acetic acid. The suspension is mixed well and held overnight at +1° C. The volume at this step is 325 liters. The precipitate is removed in a Sharples centrifuge and discarded and the supernatant is further clarified by passing through a Sparkler filter. The volume at this step is 240 liters. The pH of this filtrate is adjusted to 5.8 with 170 cc. of 5 Normal sodium hydroxide. 175 liters of 95% ethanol at −25° C. are added to the extract bringing the ethanol concentration to 40%. The temperature is −10° C. The suspension is allowed to remain overnight at between −5 to −10° C. The precipitate is removed in a Sharples and the supernatant is discarded. The precipitate which weighed 6.9 kg. is suspended in 22 liters of 0.15 M sodium acetate at +1° C. and the mixture was agitated for 24 hours. The suspension is clarified by passing through a Sharples centrifuge and the precipitate is discarded. The supernatant is reclarified by passing through a Republic filter press using coarse filter pads and Hi-Flo filter aid. This final solution which contains the catalase is lyophilized.

*Example VI*

500 grams of frozen comminuted beef liver are suspended in 1250 ml. of water at +1° C. and stirred for 18 hours. The residue is centrifuged and discarded. The supernatant is adjusted to pH 5.3 with 1 N acetic acid and held overnight at +1° C. The residue is removed by centrifugation and the supernatant is adjusted to pH 5.8 with 1 N sodium hydroxide. 95% ethanol at −25° C is added to a 40% concentration and the mixture is held overnight at −5° C. The precipitate is removed by centrifugation and suspended in 250 ml. of .075 sodium acetate. The solution of catalase is clarified by centrifugation and adjusted to pH 5.7 with 1 N acetic acid for crystallization. The crystalline catalase which is removed by centrifugation, is suspended in water and dialyzed against running tap water until the enzyme becomes solubilized. The solution of catalase is clarified.

*Example VII*

300 grams of frozen comminuted beef liver is washed with 600 ml. of 70% ethanol at −5° C. for three hours. The suspension is centrifuged and the residue is suspended in 750 ml. of ice-cold water. The pH of this suspension is adjusted to 5.3 with 1 N acetic acid and the mixture is allowed to stand overnight at +1° C. The precipitate is removed by centrifugation and the supernatant, 700 ml., is adjusted to pH 5.8 with 1 N sodium hydroxide. 509 ml. of 95% ethanol at −25° C. are added to bring the solution to 40% ethanol concentration. The mixture is held overnight at −5° C. The precipitate is removed by centrifugation and suspended in 0.075 M sodium acetate. The solution of catalase is clarified after several hours and the pH is adjusted to 5.8 with 1 N acetic acid for crystallization. After 24–48 hours, the crystalline precipitate is removed by centrifugation, suspended in water and dialyzed against running tap water for several days. The soluble catalase solution is clarified.

While in the foregoing specification I have set out the various steps of this invention in considerable detail for purpose of illustration, it will be understood by those skilled in the art that many of the details set forth can be varied considerably without departing from the scope of this invention.

I claim:

1. In a process for obtaining from liver tissue at least one enzyme selected from the group consisting of catalase, cathepsin and arginase, said tissue being selected from the group consisting of beef liver tissue and hog liver tissue, the steps of washing said tissue with a mixture of water and ethanol at a temperature ranging from −3 to −15° C., said ethanol being present in said mixture while it is in contact with said tissue in concentrations ranging from 40 to 50% by volume, extracting the residual solid material with water at a pH ranging from 6.3 to 6.7, subsequently subjecting the extract thus obtained to an isoelectric precipitation at a pH within the range from 5.2 to 5.4 to obtain a purified enzyme extract, fractionating said extract at a pH ranging from 5.4 to 6.2, at an ionic strength below .1, and at a temperature between −3 to −15° C. by adding an organic solvent thereto to a concentration of between 20 to 50% by volume said organic solvent being selected from the group consisting of ethanol and methanol, and separating the resulting precipitate from the supernatant.

2. In a process for preparing crystalline catalase from comminuted beef liver tissue, the steps of washing said tissue with a mixture of water and ethanol at a temperature ranging from −3 to −15° C., said ethanol being present in said mixture while it is in contact with said tissue in concentrations ranging from 40 to 50% by volume, extracting the residual solid material with water at a pH ranging from 6.3 to 6.7, subsequently subjecting the extract thus obtained to an isoelectric precipitation at a pH within the range from 5.2 to 5.4 to obtain a purified enzyme extract, fractionating said extract at a pH ranging from 4.2 to 7.4, at an ionic strength below .2, and at a temperature below 0° C. by adding an organic solvent thereto to a concentration of between 15 to 60% by volume said organic solvent being selected from the group consisting of ethanol and methanol, separating the resulting precipitate from the supernatant, dissolving said precipitate in water at a pH above 5.8, subsequently adjusting the pH of the resulting solution to between 5.1 and 6.3 to crystallize the catalase, and then separating the crystallized catalse from the supernatant liquid.

3. In a process for obtaining from liver tissue at least one enzyme selected from the group consisting of catalase, cathepsin and arginase, the steps of extracting said liver tissue with water to obtain an aqueous enzyme extract, separating said enzyme extract from the residue of said tissue, then subjecting the separated enzyme extract to an isoelectric precipitation at a pH within the range of from 5.0 to 5.6 to obtain a purified enzyme extract, and separating the resulting precipitate from said purified enzyme extract.

4. In a process for obtaining from liver tissue at least one enzyme selected from the group consisting of catalase, cathepsin and arginase, the steps of washing liver tissue with a mixture of water and an organic solvent selected from the group consisting of acetone and the lower pirmary alcohols having less than 5 carbon atoms at a temperature below 0° C., said organic solvent being present in said mixture while it is in contact with said tissue at a concentration within the range of from 30 to 70% by volume, separating the resulting wash solution from the residue of said tissue, extracting the separated tissue residue with water at a pH within the range of from 5.0 to 5.6 to obtain an enzyme extract, and separating said enzyme extract from the tissue residue.

5. In a process for obtaining from liver tissue at least one enzyme selected from the group consisting of catalase, cathepsin and arginase, the steps of washing liver tissue with a mixture of water and ethanol at a temperature within the range of from −3 to −15° C., said ethanol being present in said mixture while it is in contact with said tissue at a concentration within the range of from 40 to 50% by volume, separating the resulting wash solution from the residue of said tissue, extracting said residue with water at a pH of from 6.3 to 6.7 to obtain an enzyme extract, separating said enzyme extract from the tissue residue, then subjecting the separated enzyme extract to an isoelectric precipitation at a pH within the range of from 5.2 to 5.4 to obtain a purified enzyme extract, and separating the resulting precipitate from said purified enzyme extract.

6. In a process for preparing crystalline catalase from liver tissue, the steps of extracting said liver tissue with water to obtain an aqueous enzyme extract, separating said enzyme extract from the residue of said tissue, then subjecting the separated enzyme extract to an isoelectric precipitation at a pH within the range of from 5.0 to 5.6 to obtain a purified enzyme extract, separating the resulting precipitate from said purified enzyme extract, fractionating the separated purified enzyme extract at a pH ranging from 4.2 to 7.4, at an ionic strength below 0.2 and at a temperature below 0° C. by adding an organic solvent thereto to a concentration of between 15 and 60% by volume, said organic solvent being selected from the group consisting of ethanol and methanol, separating the resulting precipitate from the supernatant, dissolving the separated precipitate in water at a pH of about 5.8, subsequently adjusting the resulting solution to a pH of from 5.1 to 6.3 to crystallize the catalase, and separating the crystallized catalase from the supernatant.

7. In a process for preparing crystalline catalase from liver tissue, the steps of extracting said liver tissue with water at a pH within the range of from 5.0 to 5.6 to obtain an enzyme extract, separating said enzyme extract from the residue of said tissue, fractionating the separated enzyme extract at a pH ranging from 5.4 to 6.2, at an ionic strength below 0.1, and at a temperature between −3 and −15° C. by adding an organic solvent thereto to a concentration of between 20 and 50% by volume, said organic solvent being selected from the group consisting of ethanol and methanol, separating the resulting precipitate from the supernatant, dissolving the separated precipitate in water at a pH above 5.8, said water containing a salt having buffering properties in aqueous solution, subsequently adjusting the resulting solution to a pH of from 5.1 to 6.3 to crystallize the catalase, and separating the crystallized catalase from the supernatant.

8. In a process for obtaining from liver tissue at least one enzyme selected from the group consisting of catalase, cathepsin and arginase, the steps of extracting said liver tissue with water at a pH within the range of from 6.0 to 7.0 to obtain an aqueous enzyme extract, separating said enzyme extract from the residue of said tissue, then subjecting the separated enzyme extract to an isoelectric precipitation at a pH within the range of from 5.0 to 5.6 to obtain a purified enzyme extract, separating the resulting precipitate from said purified enzyme extract, fractionating the separated purified enzyme extract at a pH ranging from 4.2 to 7.4, at an ionic strength below 0.2, and at a temperature below 0° C. by adding an organic solvent thereto to a concentration between 15 and 60% by volume, said organic solvent being selected from the group consisting of methanol and ethanol, and separating the resulting precipitate from the supernatant.

9. In a process for obtaining from liver tissue at least one enzyme selected from the group consisting of catalase, cathepsin and arginase, the steps of extracting said liver tissue with water at a pH within the range of from 5.0 to 5.6 to obtain an enzyme extract, separating said enzyme extract from the residue of said tissue, fractionating the separated enzyme extract at a pH ranging from 4.2 to 7.4, at an ionic strength below 0.2, and at a temperature below 0° C. by adding an organic solvent thereto to a concentration of between 15 and 60% by volume, said organic solvent being selected from the group consisting of ethanol and methanol, and separating the resulting precipitate from the supernatant.

References Cited in the file of this patent

Michaelis et al.: Biochemisches Zeitschrift 53 (1913), pp. 334–335.

"Practical Physiological Chemistry," by Hawk et al., 12th ed., 1937, pub. by The Blakiston Co. (Phila.) pp. 158, 266, 267 and 285.

Bonnischen, R. K.: Arch. Biochim. 12 (1947), pp. 83–86.

"Chemistry and Technology of Enzymes," by H. Tauber, 1949, pub. by John Wiley & Sons, Inc. (N. Y.), pp. 189 to 192.

Sumner and Myrback, vol. II, part I, pp. 409–412.

Advances in Enzymology, vol. 14, pp. 377–379.

UNITED STATES PATENT OFFICE
CERTIFICATE OF CORRECTION

Patent No. 2,834,713                                                          May 13, 1958

Kenneth C. Robbins

It is hereby certified that error appears in the printed specification of the above numbered patent requiring correction and that the said Letters Patent should read as corrected below.

Column 10, line 10, for "about" read — above —.

Signed and sealed this 25th day of August 1959.

(SEAL)

Attest:

KARL H. AXLINE                                                 ROBERT C. WATSON

Attesting Officer                                              Commissioner of Patents